United States Patent [19]

Latella, Jr.

[11] Patent Number: 5,398,811
[45] Date of Patent: Mar. 21, 1995

[54] VACUUM SEALED CANISTER

[76] Inventor: Demetrio A. Latella, Jr., 34 Stiles La., Greenwich, Conn. 06831

[21] Appl. No.: 209,680

[22] Filed: Mar. 10, 1994

[51] Int. Cl.⁶ .................. B65D 81/20; B65D 51/16
[52] U.S. Cl. .................. 206/524.8; 220/231; 99/472
[58] Field of Search .................. 206/524.8, 216; 215/228; 99/454, 472; 220/231

[56] References Cited

U.S. PATENT DOCUMENTS

| | | | |
|---|---|---|---|
| 1,572,190 | 2/1926 | Don | 206/524.8 |
| 3,163,315 | 12/1964 | Wilson | 220/231 |
| 3,523,684 | 8/1970 | Cuscino et al. | 226/34 |
| 3,769,902 | 11/1973 | Hurwitz | 99/472 |
| 4,337,804 | 7/1982 | Maruscak | 206/524.8 X |
| 4,339,054 | 7/1982 | Kellogg | 220/231 X |
| 4,362,095 | 12/1982 | Wheatley | 99/472 |
| 4,901,634 | 2/1990 | Kuwahara et al. | 99/472 |
| 4,989,759 | 2/1991 | Gangloff | 222/153 |
| 5,142,970 | 9/1992 | ErkenBrack | 99/472 |
| 5,195,427 | 3/1993 | Germano | 99/472 |

*Primary Examiner*—Jacob K. Ackun, Jr.
*Attorney, Agent, or Firm*—Martin J. Spellman, Jr.

[57] ABSTRACT

A vacuum sealed canister unit which includes two parallel integrally constructed interconnected cylinders. A large cylinder defines a canister for storing food items and has a wide top opening with removable cover which can be sealed in place. The vacuum is released by a valve mechanism incorporated in the cover and handle of the large cylinder. The storage container is connected to a vacuum pump chamber by a passageway with a one-way check valve on the pump side. The arrangement of the vacuum pump shaft allows outside air pressure on the top side of the pump assembly shaft to be equalized and the pump handle to be stored in a down stroke position after pumping is complete. To operate, one places the thumb over a hole in the handle and depresses the handle. Space above a piston at the base of the handle shaft expands, drawing a vacuum in the storage container as air is drawn through the connecting passage between the cylinder. Upon raising the handle, the check valve closes to maintain the vacuum in the storage container. Once the desired vacuum is established, the thumb is removed from the hole in the pump handle and the pump shaft easily returned to the down stored position. The check valve remains closed to maintain the established vacuum in the canister storage section.

1 Claim, 4 Drawing Sheets

VACUUM SEALED CANISTER

BACKGROUND OF THE INVENTION

1. Field of the Invention

This invention relates to storage containers and more particularly to canisters for storing food products under a low vacuum in order to help preserve the freshness of the food.

2. Prior Art

It is well known that many persons attempt to preserve the freshness of food by isolating it from ambient air by placing it in conventional containers, plastic lock bags, covering open bowls with plastic wrap and the like.

Some food items such as ground coffee come in vacuum packed cans with reusable plastic tops in an attempt to limit the development of staleness by minimizing contact with ambient air. There is presently not available a reusable vacuum sealed container such as a canister suitable for use in the average kitchen to preserve the freshness of cookies, crackers, tea, raisins, dried fruit, brown sugar, coffee and similar items which has an attractive appearance, is stable during pump activation, simple to operate, wherein the contents are readily accessible, and in which the canister can be sealed or unsealed rapidly in a easy and convenient way.

The present invention provides a very attractive and stable vacuum sealed canister in which the freshness of food can be maintained by storage in a low vacuum. The vacuum is readily achieved with a few strokes of a plunger handle. The vacuum is securely maintained. A specially designed lid and handle is easily manipulated to release the vacuum seal and provide access to the interior contents of the canister.

A typical example of an almost universally enjoyed item is ground coffee which loses its freshness rapidly if exposed to ambient air. Some people have utilized the reusable coffee cans with plastic lids by storing them in the refrigerator in an attempt to minimize the development of staleness, but this practice is generally unsatisfactory.

In U.S. Pat. No. 4,362,095, Wheatley, a storage container for ground coffee is disclosed wherein a vacuum container is provided with an attached hand operated vacuum pump. The container has an extremely narrow neck opening with a filter that interferes with filling the container. In order to release the vacuum a rubberized cap must be turned which is extremely hard because of the large area over which the differential pressure is acting, thus making the device inconvenient and difficult to use. In addition, the construction is such that operating the vacuum pump requires two hands and structure has a tendency to tip over.

SUMMARY OF THE INVENTION

The vacuum sealed canister unit of the present invention is generally made of glass or ceramic material. The unit comprises two parallel integrally constructed interconnected cylinders, a large one defining the canister for storing and housing the food item. The storage chamber cylinder has a wide top opening with removable lid with an isoprene gasket seal about its perimeter for reliable sealing.

In the present invention, the vacuum is readily released by a ball valve mechanism incorporated in the cover and handle. It is easy to release as opposed to the Wheatley structure discussed above. In Wheatley, the whole container must be lifted to dispense its contents which is extremely inconvenient. The pump housing of the Wheatley is higher than the container housing from the underlying support surface and makes operation unstable, requiring two hands to steady and operate.

The handle on top of the lid is comprised of two parts. It incorporates a unique vacuum release mechanism requiring only a slight turn to release the lid and access to the contents of the canister.

The vacuum release mechanism consists of a spring loaded steel ball housed in a rotable upper part of the handle. When the handle is in the closed position, the partially exposed steel ball is in place over an opening closing off a passageway to the container interior through the lower section of the handle and the lid. When the vacuum is present, the lid cannot be easily removed because of the exterior pressure acting against it. A slight turn on the upper portion of the handle will slide the steel ball away from the passage to the interior of the canister and air will enter and equalize the interior and exterior pressures, permitting the lid to be easily removed.

This storage container has a wide mouth opening and thus is very accessible for removing the contents.

The vacuum is obtained with just a couple of strokes on the pump handle. The vacuum pump chamber and the storage chamber are connected by a passageway with a one-way check valve on the pump side.

This check valve is of simple and reliable construction. There is an air vent at the bottom of the pump chamber below the piston. There is a passage in the center and the shaft itself has a bore of a given size almost its whole length from the top side of the plunger through the handle. The shaft allows outside air pressure to enter the top side of the plunger to permit pump assembly shaft and handle to be stored in the down stroke position after the pumping is completed.

To operate the pump, one places a thumb or the like over the hole in the handle in order to create the vacuum in the canister chamber. One hand pumping is possible.

As the pump handle is depressed, the space above the piston expands drawing a vacuum in the storage container as air is drawn through the filter. On raising the handle, the check valve closes to maintain the vacuum in the storage container. When the vacuum is established, the thumb is removed from the hole in the pump handle and the pump shaft returned to the down position. The check valve remains closed to maintain the established vacuum in the canister storage section.

BRIEF DESCRIPTION OF THE DRAWING

In the accompanying drawing which forms a part of this specification.

ILLUSTRATIVE SPECIFIC EMBODIMENT

Figure 1:
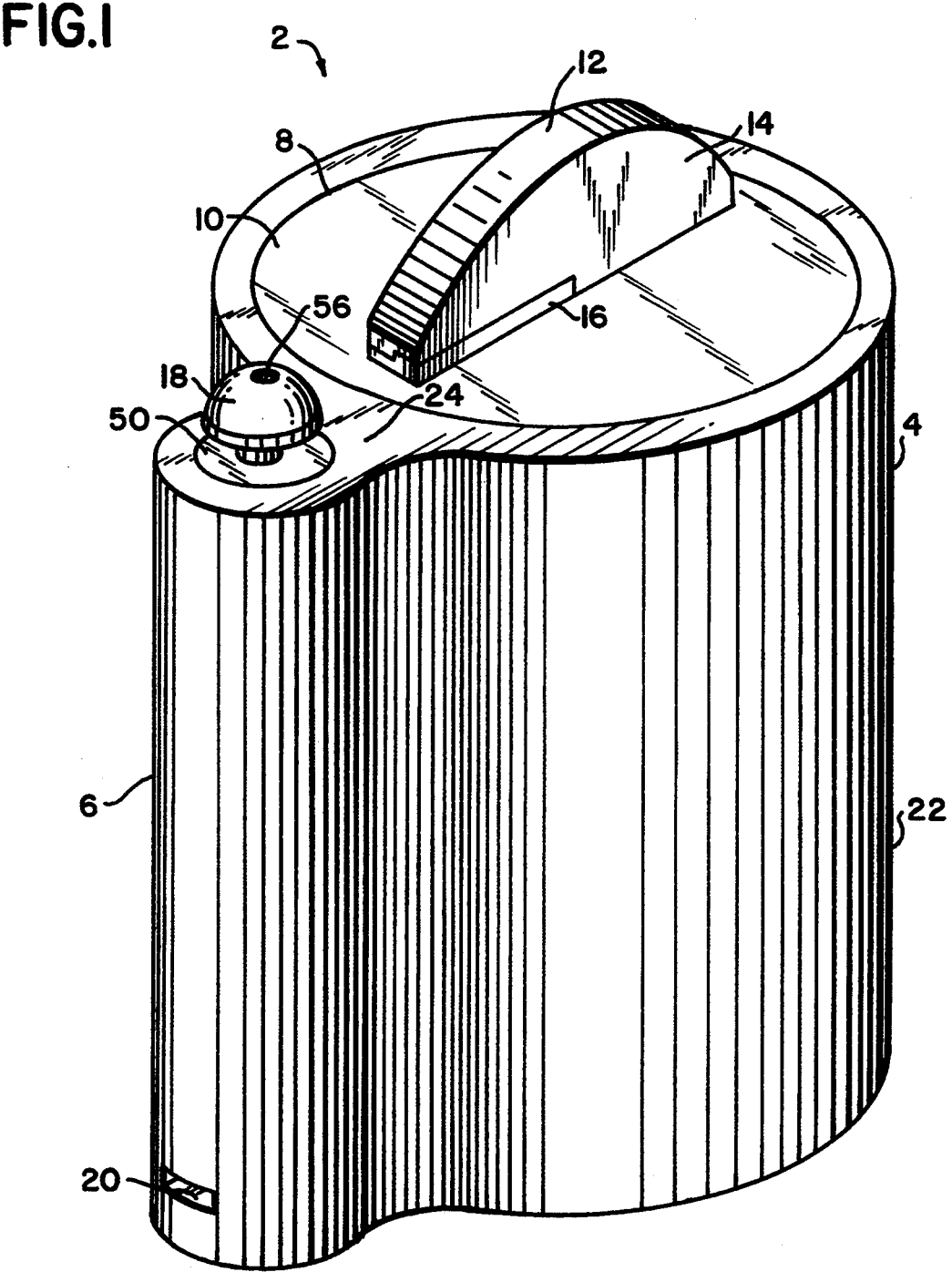
FIG. 1 is a perspective view of the vacuum sealed canister according to the present invention.
Figure 2:
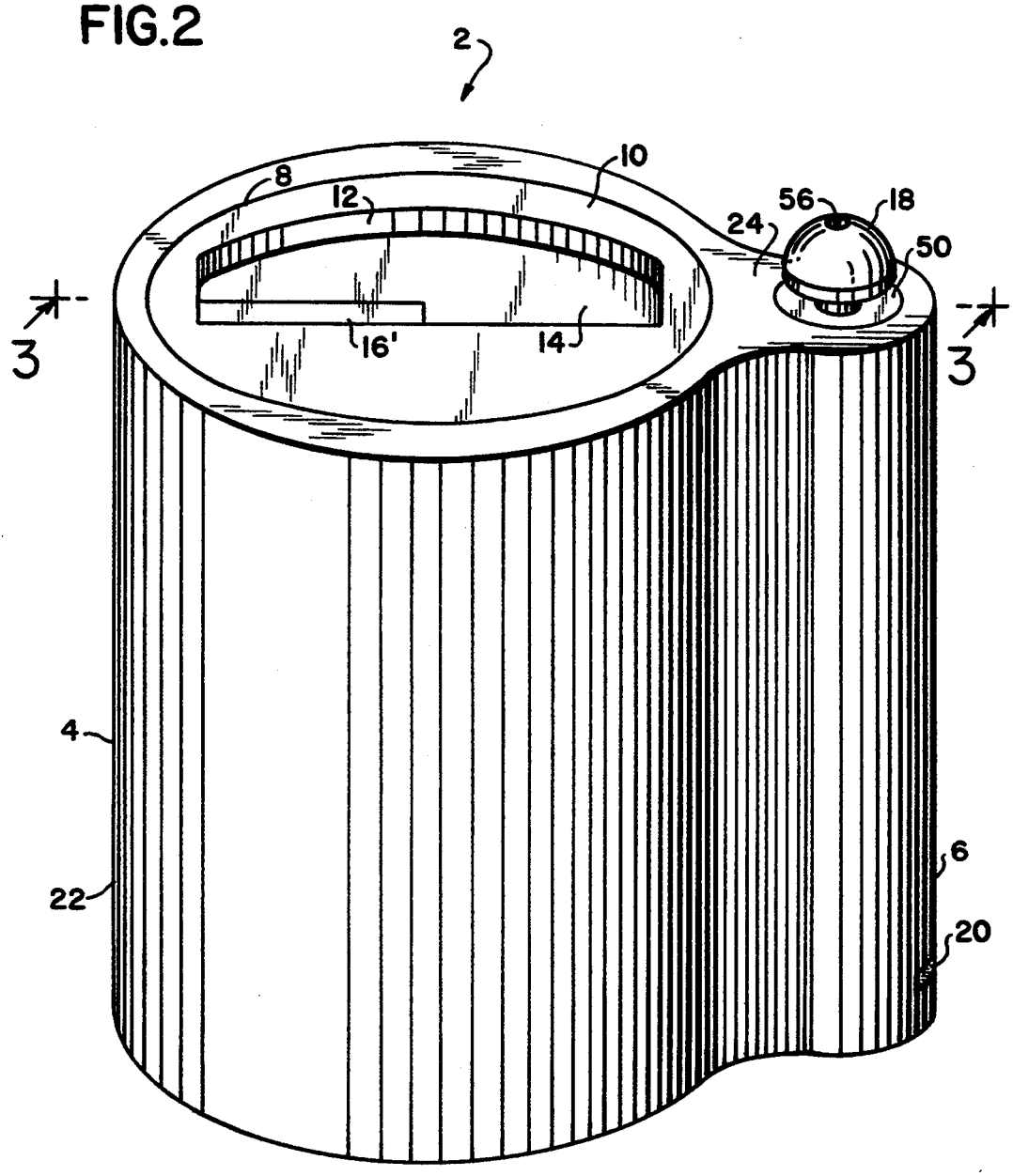
FIG. 2 is a further perspective view of the canister from the side and top angle.
Figure 3:
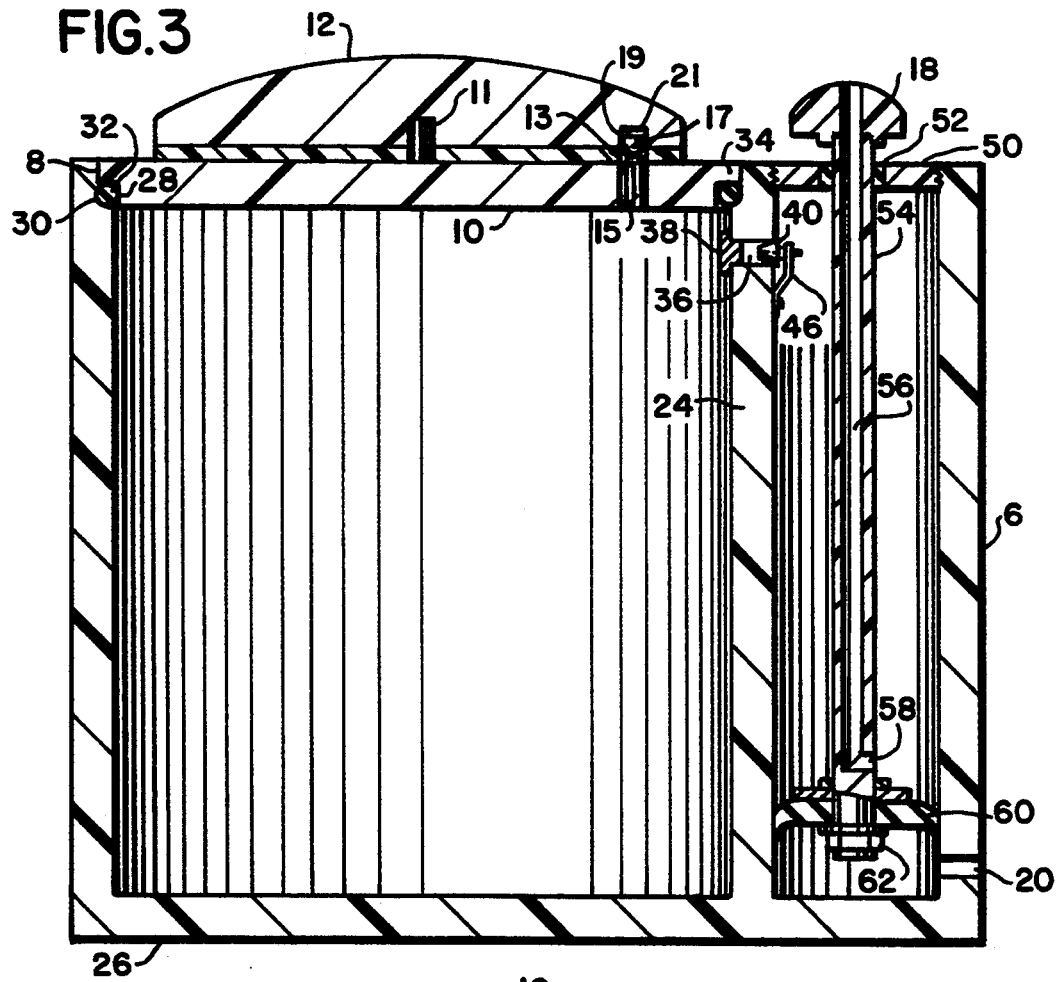
FIG. 3 is a sectional view taken along lines 3—3 of FIG. 2.
Figure 4:
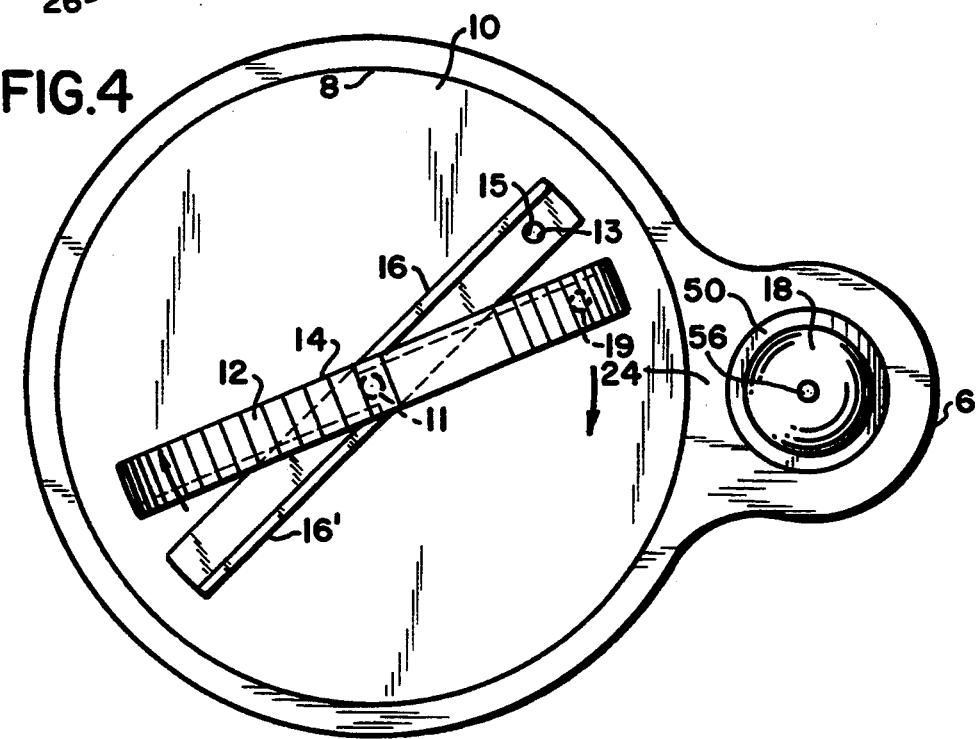
FIG. 4 is a top view, with the handle partially in phantom to show the parts in different positions.
Figure 5:
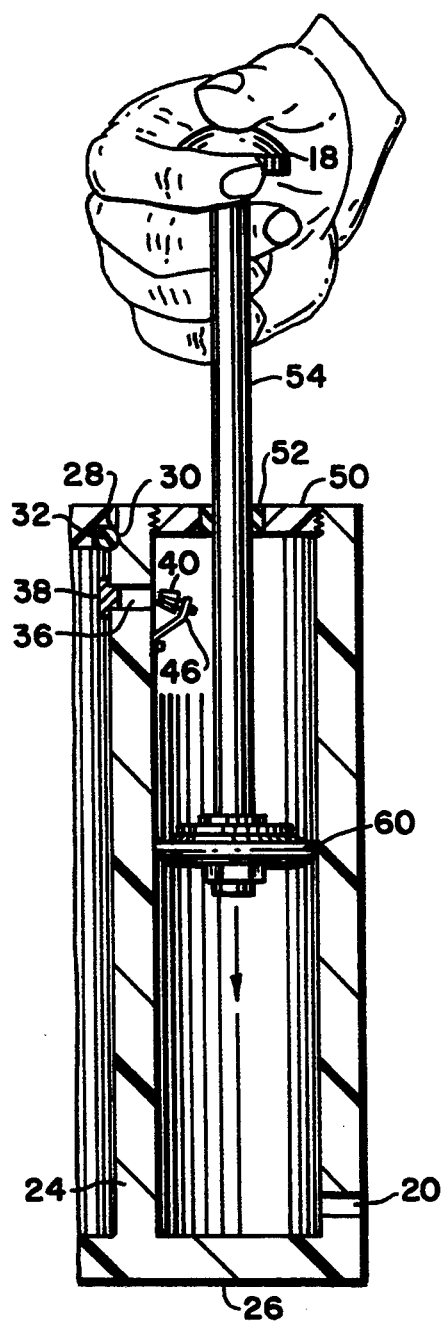
FIG. 5 is an enlarged side sectional view of the vacuum pump portion of the canister device showing the plunger in the down stroke cycle, with the check valve in the open position.
Figure 6:
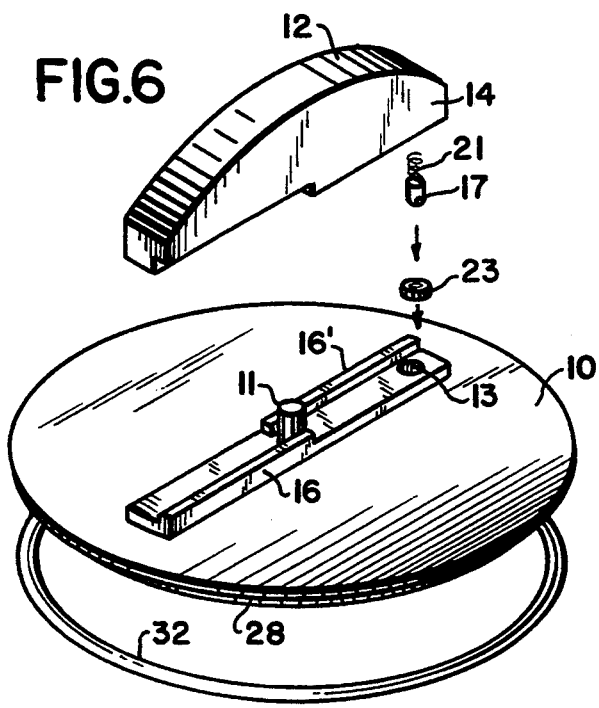
FIG. 6 is an expanded perspective view of the canister cover top and vacuum release valve.
Figure 7:
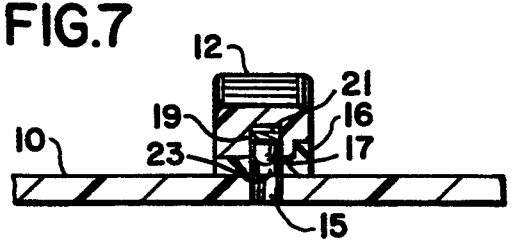
FIG. 7 is an end view, partially in section of the vacuum release valve located in the handle.
Figure 8:
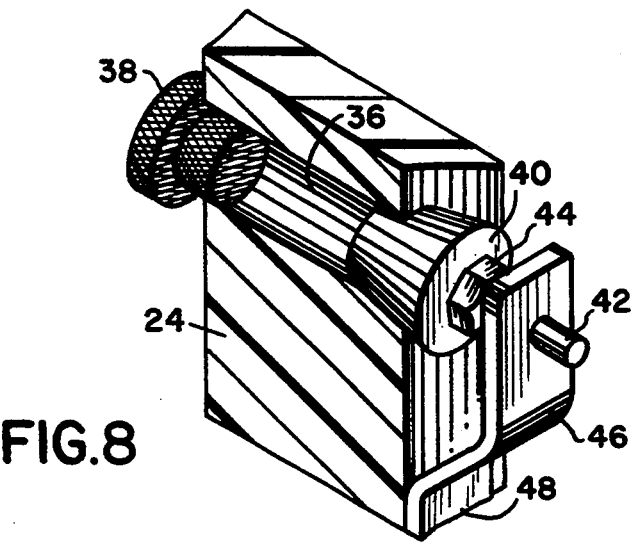
FIG. 8 is an enlarged cutaway view of the vacuum pump check valve mounted in the wall common to the canister and pump cylinder.

Referring to the accompanying drawing, the vacuum sealed canister of the present invention is indicated in general at 2 and comprises cylindrical storage canister section 4, and vacuum pump cylinder section 6. The storage canister section 4 is closed at its bottom 26 and has a wide-mouth opening 8. In the closed position, it is sealed shut by the flat cover or lid 10. The cover or lid 10 is provided with a handle 12 comprising a base section 16 and a top section 14 which is pivotally mounted on the pin 11.

The vacuum cylinder 6 has a pump handle 18 at the top of the shaft 54 thereof. The cylinder 6 is vented at the base through the outer wall 22 at exhaust port 20 below the piston 60. The wall section 24 separates the canister section 4 from the vacuum pump section 6. Both cylinders 4 and 6 are closed by the common bottom 26. The top of the vacuum section 6 is closed by closure 50 having a central rubber seal 52 through which the plunger shaft 54 slides in sealing engagement.

A cylindrical air passage 36 is provided in a common wall 24 at the top thereof. On the canister side of wall 24, an air permeable filter 38 is placed at the opening of passage 36 with a check valve 40 mounted on the other side and carried on shaft 42 to which it is secured by brazed nut 44 on the shaft 42. This in turn is mounted on the spring bracket 46 with the base 47 thereof secured to the outside of the wall 24 by adhesive or other suitable means.

The shaft 54 is provided with the longitudinal annular passage 56 which opens at the top of the handle 18 and exits the side of the shaft 54 at the base 58 thereof. The shaft 54 is provided with a rubber gasket or piston head 60 secured to the shaft 54 by a threaded nut 62.

An O ring seal 32 or similar seal is carried within the ledge 28 of the lid 10 and seals with the recess 30 and the top of the canister section 4.

The lid 10 has a passage 15 therethrough which is aligned with similar passage 13 in the base 16 of handle 12. A recess 19 holds spring 21 which is secured to and bears downwardly against ball valve 17. A rubber valve seat 23 is held in a recess at the top of passage 15 in lid 10 and handle base 16.

The pump handle 18 is secured to the top of shaft 54 and the interior passage 56 opens in the handle 18. This allows the shaft 54 to be easily stored in the downward position by venting. To pump, the user covers the opening of passage 56 in handle 18 with their thumb. Air below the rubber piston 60 escapes through 20 as the plunger 60 is depressed. The plunger 60 is secured to the cap shaft by unit 62.

As the plunger 60 is depressed, air is drawn from the canister section 4 through filter 38, passage 36 into chamber 6. On the upstroke, valve 40 closes maintaining the vacuum in chamber 6. The pump shaft 54 is easily stored in the down position since air below piston 60 vents through port 20 and the air above through port 58 in shaft 54.

To open the canister section 4 when a vacuum is present the top 14 of handle 12 is rotated, moving ball valve 17 off seat 17 and letting outside air enter through passage 15, equalizing the pressure and permitting the lid 10 to be readily removed.

The vacuum canister of the present invention is attractive, east to operate and keeps food fresh for extended periods of time.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. A vacuum sealable canister unit comprising a storage canister integrally formed with a cylindrical vacuum pump chamber, said canister and said chamber having an air passage there between, said canister having a wide top opening and a removable lid for closing said canister air tight, said lid having an air passage therethrough, a handle on the top of said lid, a top portion of said handle being rotatable and having a spring biased ball valve in the lower surface thereof and a corresponding cooperative valve seat in the upper end of said lid passage to thereby selectively open and close said passage, an air filter for the passage between said canister and said pump chamber, one-way check valve means to close said passage to the flow of air from said pump chamber to said canister, means venting said pump chamber below the piston thereof to the outside, and handle means to move said piston up and down, a closeable vent means to vent the upper portion of said pump chamber to the outside.

* * * * *